United States Patent [19]

Bunyan

[11] 3,772,759
[45] Nov. 20, 1973

[54] FASTENING OF WHEELS, PROPELLERS AND THE LIKE

[75] Inventor: Thomas Walter Bunyan, London, England

[73] Assignee: P & O Pilgrim Valve Limited, London, England

[22] Filed: June 28, 1971

[21] Appl. No.: 157,641

Related U.S. Application Data

[63] Continuation of Ser. No. 820,878, May 1, 1961, abandoned.

[52] U.S. Cl. .................................................. 29/252
[51] Int. Cl. .......................................... B23p 19/04
[58] Field of Search .................. 29/252, 243.52, 282

[56] References Cited
UNITED STATES PATENTS

| | | | |
|---|---|---|---|
| 1,959,901 | 5/1934 | Buehle | 29/252 X |
| 3,033,597 | 5/1962 | Miller | 29/252 X |
| 3,104,459 | 9/1963 | Wendt | 29/252 |

Primary Examiner—Andrew R. Juhasz
Assistant Examiner—Leon Gilden
Attorney—Woodcock, Washburn, Kurtz & Mackiewicz

[57] ABSTRACT

An assembly enabling the hub of a wheel, impeller, propeller or the like applied over the free end of a shaft, to be moved towards or away from that free end of the shaft, the assembly consisting of a shear member in the form of a removable divided ring mounted in an axially fixed position in an annular groove formed in a parallel cylindrical pintle at the free end of the shaft and a reaction pressure ring comprising a ring body of a size to be a sliding fit on the pintle and having an annular pressure chamber at one end containing a fitting annular piston movable by introduction of a pressure liquid into the pressure chamber, the reaction pressure ring being in contact with the shear member and engaged or connected with the adjacent end of the hub to be moved so that on introduction of pressure into the pressure chamber the distance of the hub from the stationary shear member is changed.

5 Claims, 3 Drawing Figures

FASTENING OF WHEELS, PROPELLERS AND THE LIKE

This application is a continuation of Ser. No. 820,878, filed May 1, 1961, now abandoned.

The present invention relates to a method of moving the hub of a wheel, a ship's propeller, an impeller or the like to achieve and thereafter maintain a desired mounted location thereof on a shaft over which the hub has been preliminarily applied or to displace a hub from such a set mounted position, the invention being of particular utility for moving the hubs of objects of great weight and size often required to be keyed or force-fitted to a shaft.

Ships' propellers for example are usually mounted on propeller shafts having a tapered tailshaft portion near their free ends on which the correspondingly internally tapered hubs of the propellers are fitted, the torque transmission connection being achieved by the use of keys, by endwise force-fitting or both, and the final endwise locating movement of the hub of the propeller on the shaft and retention in the located position has been achieved by the use of a nut screwed upon a screw-threaded parallel free end portion, hereinafter termed the pintle, at the extremity of the shaft.

With large shafts and propellers in common use today the size of nut required for this purpose has become so great, they often exceed two tons in weight, that the combined efforts of several men have been required merely to screw the nut along the threads on the pintle and furthermore there is an ever-present possibility of the nut seizing on the threads of the pintle.

These difficulties have made necessary a preliminary meticulous cleaning of the threads of both the nut and the pintle followed by careful application of an extremely high pressure lubricant.

It is an object of the present invention to provide a method of moving the hub of a wheel, propeller, impeller or the like on a shaft in the direction away from the free end of the shaft into a required set mounted position by means accessible at the side of the hub nearest the free end of the shaft and retaining it in such set mounted position without the need for a threaded nut screwed on the pintle.

It is a further object of the invention to provide a method of moving the hub of a wheel, impeller, propeller or the like from such a set mounted position in the direction towards the free end of the shaft by means accessible at the side of the hub nearest the free end of the shaft, again without the need for a threaded nut screwed on the pintle.

The invention comprises a method of effecting relative axial movement between a shaft and a hub applied over the free end of the shaft, said method consisting in applying a detachable shear member or members in a predetermined axially fixed and radially outwardly projecting position to the pintle of the shaft, applying a reaction pressure ring of sliding fit on said pintle, said reaction pressure ring comprising a ring body having an annular chamber at one end containing a fitting annular piston movable axially of the ring body by the introduction of a pressure liquid into said chamber from the exterior to increase the overall thickness of the reaction pressure ring, engaging said reaction pressure ring with the radially outwardly projecting part or parts of said shear member or members and engaging or connecting said reaction pressure ring with the end of the hub nearest the shear member on the pintle, introducing pressure liquid into the chamber in the reaction pressure ring to move the annular piston and increase the overall thickness of the reaction pressure ring and thereby change the distance between the hub and the axially fixed shear member or members.

The invention further consists in an assembly for use in moving the hub of a wheel, impeller, propeller or the like applied over the end of a shaft, in the direction away from the free end of the shaft into a desired position on the shaft by a method as above set forth and for retaining the hub in the desired mounted position, the assembly comprising a split or divided annular shear member detachably mounted in an axially fixed position in a circumferential channel in the pintle of the shaft with a part of the shear member extending radially outwards of said pintle, a reaction pressure ring of a size for sliding engagement on said pintle, said reaction pressure ring comprising a ring body having an annular chamber at one end containing a fitting annular piston movable axially of the ring body by the introduction of pressure liquid into the annular chamber from the exterior to increase the overall thickness of the reaction pressure ring, said reaction pressure ring being mounted between the shear member and the adjacent end of the hub and in contact with the shear member, and retaining screws extending in compression between the reaction pressure ring and the adjacent end of the hub when the hub is in the set mounted position.

The invention further consists in an assembly for use in moving the hub of a wheel, impeller, propeller or the like mounted on a shaft, in the direction towards the free end of the shaft by the method as set forth above to displace it from the set mounted position on the shaft, said assembly comprising a split or divided annular shear member detachably mounted in an axially fixed position in a circumferential channel in the pintle of the shaft with the outer portion of the shear member extending radially outwards of said pintle, a reaction pressure ring of a size for sliding engagement on said pintle, said reaction pressure ring comprising a ring body having an annular chamber at one end containing a fitting annular piston movable axially of the ring body by introduction of pressure liquid into the annular chamber from the exterior to increase the overall thickness of the reaction pressure ring said reaction pressure ring being mounted on the pintle with the annular piston in contact with the shear member at the side thereof away from the adjacent end of the hub to be moved and screws or bolts connected in tension between said reaction pressure ring and the hub to be moved.

Arrangements for use in carrying out the invention are illustrated by way of example in the accompanying drawings as applied to the mounting and removal of a ship's propeller.

In the drawings:

FIG. 1 is a view in sectional side elevation taken on the line I—I of FIG. 2 of a part of the tapered end part of a ship's propeller shaft and a part of a correspondingly internally tapered hub of a ship's propeller applied over the tapered end part of the shaft and means for moving the hub on the shaft in the direction away from the free end of the shaft to achieve a force-fitted mounted position of the hub on the shaft and means for retaining the hub in the force-fitted and set mounted position.

Figures 1, 2:
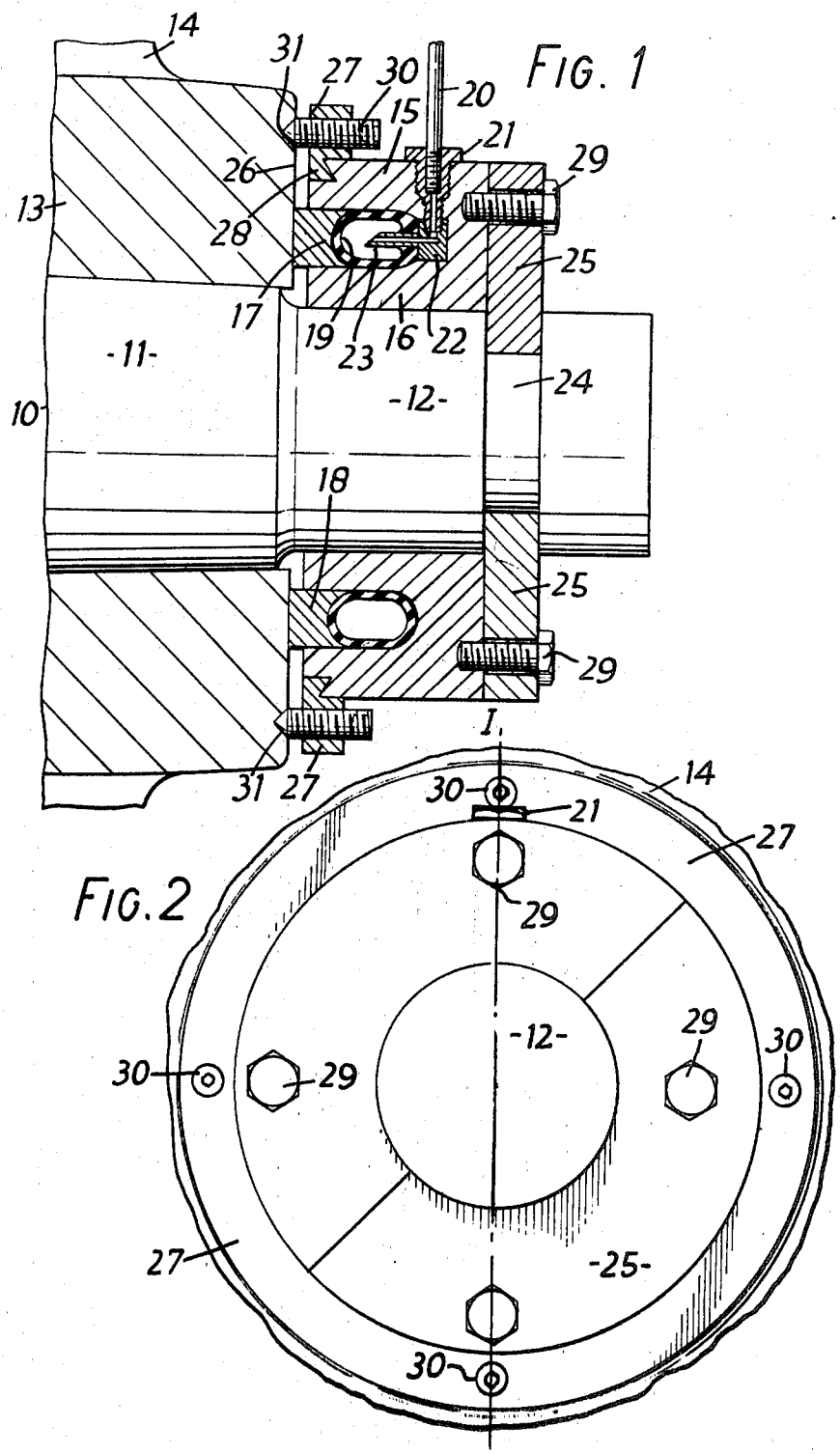
FIG. 2 is a view in end elevation taken from the right-hand end of FIG. 1.

Referring to FIGS. 1 and 2 of the drawings, 10 represents a part of a propeller tailshaft including a tapered portion 11 terminating in a reduced smooth parallel cylindrical free end portion 12, termed the pintle, and 13 is a part of the hub of a propeller 14, of internal taper similar to that of the tapered portion 11 of the tailshaft applied over the tailshaft and required to be moved a final short distance axially along the tailshaft in the direction away from the pintle 12 in order to obtain in the case illustrated in FIG. 1, a force-taper fit of the hub 13 on the tapered part 11 of the tailshaft 10.

For effecting this axial movement there is mounted on the pintle 12 an internally smooth reaction pressure ring 15 of a size to be a guided sliding fit on the pintle 12 and to be capable of engaging the outer face 26 of the applied hub 13. The reaction pressure ring 15 comprises a ring body 16 of forged steel having an annular groove 17 formed in one end face thereof, and an annular piston 18 fitting the groove 17 and movable outwards of the groove and axially of the ring 15 upon introduction of a hydraulic pressure medium under pressure from any convenient external source through a passage leading through the reaction ring 15 into the annular groove 17, in such a manner as to increase the overall thickness of the reaction pressure ring 15.

In the example shown, a tire 19 of nitrile rubber is contained in the bottom of the annular groove 17 in the reaction pressure ring 15, and high pressure grease or other hydraulic medium is introduced from the exterior by way of a tube or pipe 20 in screwed engagement with a coupler 21 mounted in a radial boring in the reaction pressure ring 15, the coupler 21 being in screwed connection with a metal block 22 housed in a recess in the bottom of the annular groove 17 and itself provided with an axially directed tubular extension 23 entering through the wall of the tire 19. Such an arrangement permits the use of very high hydraulic pressure applied in the reaction pressure ring 15 without risk of leakage.

A circumferential groove 24 is formed in the surface of the pintle 12 preferably of rectangular section as shown, and a split shear ring 25 formed of two or more separable arcuate parts, fitted in the circumferential groove 24 with part of the composite shear ring 25 extending radially outwards of the surface of the pintle 12.

The split shear ring 25 when mounted constitutes an abutment member in a position which is fixed axially of the shaft 10.

The dimensions of the reaction pressure ring 15 and the position of the shear member 25 are selected so that with the annular piston 18 retracted wholly or mainly into the annular groove 17 in the reaction pressure ring, the reaction pressure ring may occupy and substantially span the gap between the shear member 25 and the end face 26 of a hub 13 preliminarily applied over the tapered part 11 of the shaft 10, the reaction pressure ring making contact with the shear member 25.

As an example, location of the circumferential groove 24 and the shear ring 25 mounted therein, at a point about one third of the length of the pintle 12 from the free end thereof, has been found appropriate and convenient.

On the forward end of the reaction pressure ring 15 is mounted a retainer ring 27 (FIGS. 1 and 2) of larger diameter than the reaction pressure ring 15 and having an internal flange 28, preferably of dovetail form in section as shown fitting snugly in a circumferential recess of corresponding shape formed in the outer peripheral edge of the forward end of the reaction pressure ring 15.

With the retainer ring 27 and the reaction pressure ring 15 applied over the pintle 12 and the end of the annular piston 18 in engagement with the end face 26 of the hub 13 as shown in FIG. 1, the parts of the split shear ring 25 are introduced into the circumferential groove 24 in the pintle 12 and retained in position by means of a number of circumferentially distributed tap bolts 29 passed through holes in the split shear ring and screwed into threaded holes in the rear end of the reaction pressure ring 15.

Hydraulic pressure is now introduced into the tire 19 in the pressure chamber constituted by the annular groove 17 to urge the piston 18 outwards of the groove 17, thus increasing the overall thickness of the reaction pressure ring and forcing the hub 13 axially along the shaft 10 into the required mounted position of force-fitted engagement with the tapered part 11 of the shaft.

With the hydraulic pressure at least partially maintained, a number of grub screws 30 are introduced into circumferentially distributed screw-threaded holes in the retainer ring 27 and into firm engagement with the end face 26 of the hub 13, final relief of the hydraulic pressure in the reaction pressure ring 15 resulting in application of an added compressive load on the grub screws 30 corresponding to a part of the push-up load on the hub.

Prior to introduction of the grub screws 30 a drill may be applied through the holes in the retainer ring 27 to form depressions such as are shown at 31 in FIG. 1 in the end face 26 of the hub 13 for the reception of the ends of the subsequently applied grub screws so that any possibility of relative rotation between the retainer ring 27 and the mounted hub 13 is avoided.

Alternatively the depression 31 may be pre-formed in the face 26 of the hub 13.

Figure 3:
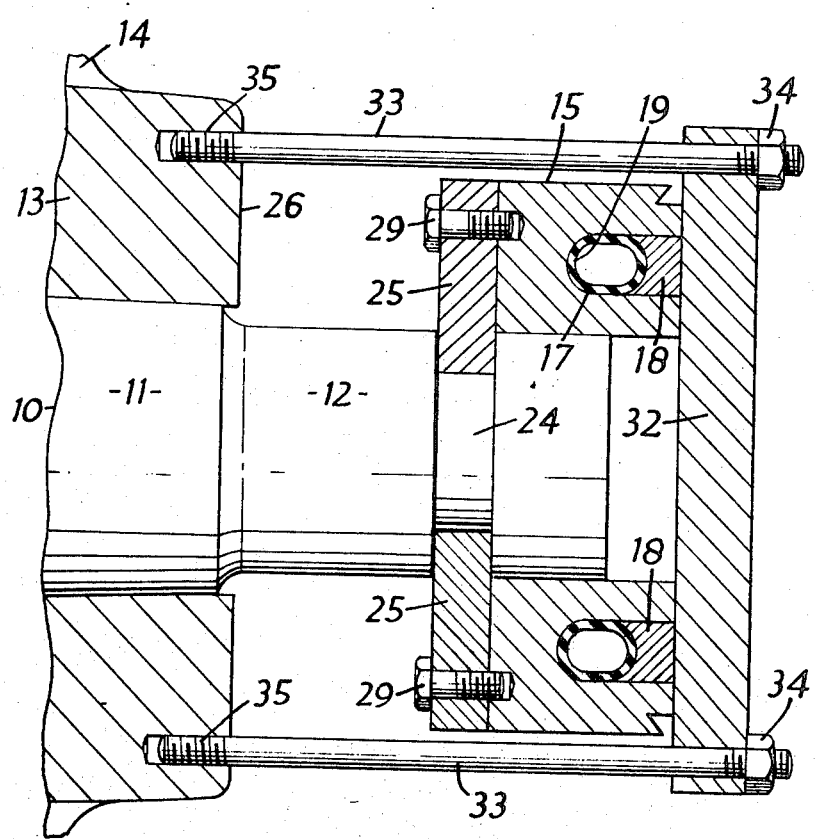
FIG. 3 is a view in sectional side elevation showing a rearrangement of parts for use in moving the hub in the direction towards the free end of the shaft to break the force-fitted mounted connection of the hub with the shaft.

In FIG. 3 an assembly of parts is shown for displacing a hub 13 axially of the shaft from a set mounted position in the direction towards the free end of the shaft in order to break the force-fitted engagement between the hub and the tapered part 11 of the shaft as a first step in the removal of the propeller from the shaft.

For this operation the grub screws 30 in the retaining ring 27 of FIG. 1 are removed, with, if necessary, a preliminary application of hydraulic pressure in the chamber 17 to relieve the compression pressure on the grub screws, and thereafter the bolts 29 are removed to permit extraction of the parts of the shear member 25 from the circumferential groove 24 and removal of the reaction pressure ring 15 and retainer ring 27 by sliding from the pintle 12 of the shaft.

The shear member 25 is now remounted in the circumferential groove 24 as shown in FIG. 3 and the reaction pressure ring 15 slid over the pintle 12 of the shaft into a position with the formerly rear end thereof against the outer or rear surface of the shear member 25 as shown in FIG. 3.

A stiff backing plate 32 is applied against the rear end of the reaction pressure ring 15 and two or more adjustable studs 33 bearing nuts 34 applied through holes in the backing plate 32 and screwed into prepared threaded holes 35 in the end face 26 of the hub 13.

In this case introduction of hydraulic pressure into the tire 19 in the pressure chamber 17 causes displacement of the backing plate 32 by the annular piston 18 and the hub 13 to be drawn along the shaft in the direction towards the outer or free end of the shaft to disengage the force-fit of the hub 13 from the tapered part 11 of the shaft.

What is claimed is:

1. An assembly for moving a hub applied over the free end of a shaft relative to the shaft comprising:
    a divided shear member adapted to be detachably mounted in an axially fixed position in a recess on a pintle portion of the shaft with part of the said shear member extending radially outwards from the pintle portion;
    a self-contained reaction pressure ring adapted to be applied over the pintle portion, said reaction pressure ring comprising a ring body of a size for sliding engagement on the pintle portion and having an annular pressure chamber in one end face and an annular piston fitting in said annular pressure chamber and movable axially of the ring body for engaging one end of the hub, inflatable tire means contained in said annular pressure chamber between said ring body and said annular piston, and a passage from the exterior of said ring body connected with said tire means for the introduction of pressure liquid into said tire means from the exterior to increase the overall thickness of said reaction pressure ring by moving said piston outwardly of said chamber against the hub, a retainer ring of larger diameter than said reaction pressure ring mounted on the same end of said ring body as said piston, means to couple said body of said reaction pressure ring to said shear member, and means carried by said retainer ring for engagement in compression with the hub to maintain the endwise pressure on the hub when the hydraulic pressure in said tire means is released.

2. An assembly as claimed in claim 1 wherein the said shear member is fixedly connected with the end of said reaction pressure ring away from the annular pressure chamber containing the said annular piston.

3. An assembly for moving a hub relative to the shaft comprising:
    a divided shear member adapted to be detachably mounted in an axially fixed position in a recess on the pintle portion of the shaft with part of the said shear member extending radially outwards from the pintle portion;
    A self-contained reaction pressure ring adapted to be removably mounted on the pintle portion and in engagement with said shear member, said reaction pressure ring comprising a ring body of a size for sliding engagement on the pintle portion and having an annular groove formed in one end face thereof away from said shear member, and an annular piston fitting said groove and movable outwardly of said groove and axially of said ring body upon introduction of a hydraulic pressure medium under pressure into said annular groove from the exterior to increase the overall thickness of said reaction pressure ring, a backing plate in abutting engagement with said annular piston, means for connecting said backing plate and the hub in tension, and means including said annular piston for moving the hub relative to the shaft.

4. An assembly as claimed in claim 3 wherein inflatable tire means is contained in said annular groove between the bottom thereof and said annular piston, and a passage from the exterior connected with said tire means to receive the hydraulic medium under pressure for increasing the overall thickness of said reaction pressure ring.

5. An assembly as claimed in claim 4 wherein the passage to said tire means comprises tubular structure extending radially through said ring body to a recess in the bottom of said annular groove and cooperating with an axially directed tubular extension entering through a wall of said tire means thereby permitting the use of very high hydraulic pressure applied in said reaction pressure ring in avoidance of leakage.

* * * * *